(No Model.)

M. E. ZELLER.
HARNESS PAD AND TREE.

No. 274,078. Patented Mar. 13, 1883.

Attest:
Charles H. Pell
Chas. Herr

Inventor:
Melancthon E. Zeller,
by, O Drake, Atty.

UNITED STATES PATENT OFFICE.

MELANCTHON E. ZELLER, OF BLUFFTON, OHIO.

HARNESS PAD AND TREE.

SPECIFICATION forming part of Letters Patent No. 274,078, dated March 13, 1883.

Application filed December 8, 1882. (No model.)

*To all whom it may concern:*

Be it known that I, MELANCTHON E. ZELLER, a citizen of the United States, residing at Bluffton, in the county of Allen and State of Ohio, have invented certain new and useful Improvements in Team Pads and Trees; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to render the use of a "jockey" in a tree-pad unnecessary, to simplify and to reduce the cost of construction of the same, and to secure other advantages which will be hereinafter enumerated.

The invention consists in certain novel features in the construction and arrangement of the several parts, as will be hereinafter fully described, and finally pointed out in the claim.

Figure 1:
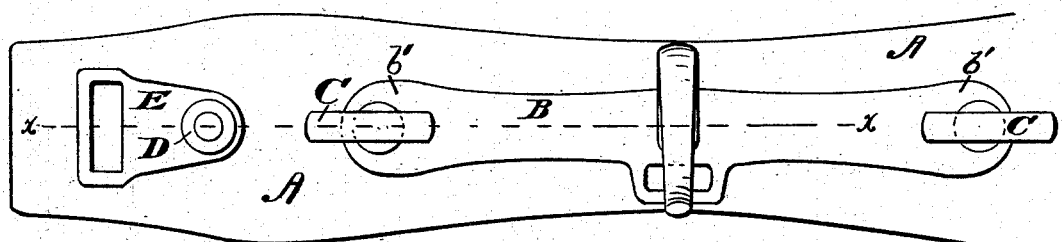
Figure 2:
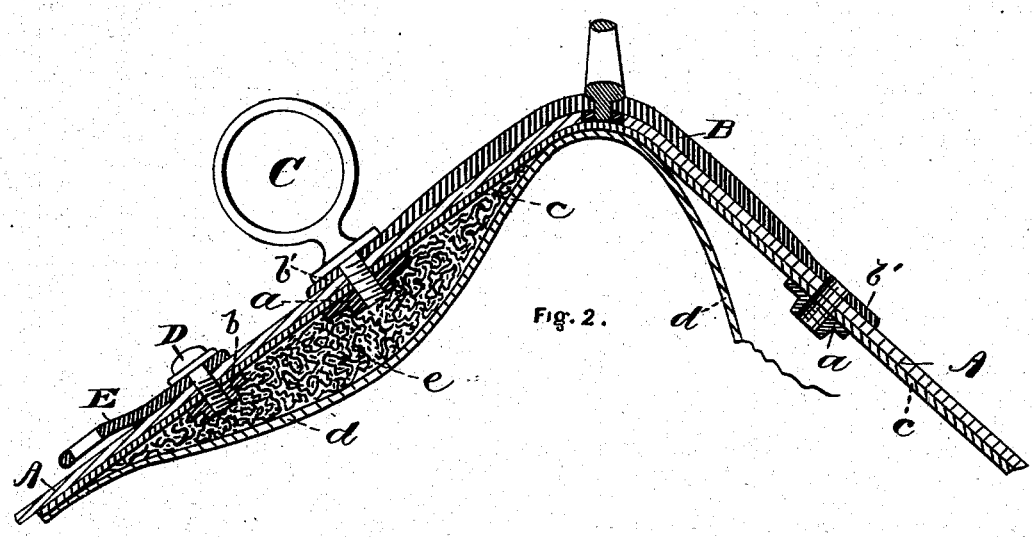

In the drawings, Figure 1 represents a top or plan view of a pad-tree embodying my improvement; and Fig. 2 is a cross-section of the same, taken through line $x$, similar letters of reference indicating corresponding parts in each of the figures.

In carrying out the invention the terret and loop burrs or nuts $a\ b$ are firmly secured to the inside of the leather burr-piece $c$ by suitable rivets or other fastenings. The bottom lining, $d$, is then secured to the said burr-piece at the edges, and the stuffing $e$ is introduced, no metal or other jockey being used, as clearly shown in Fig. 2.

The leather housing A is made separately, and a tree, B, is constructed with ends $b'$ flattened, both inside and out, in order to afford a firm bearing for the terrets and against the housing, the inside central portion of the tree being slightly concave in cross-section, so that it also will bear snugly at its edges upon the housing. The pad being stuffed and completed, the housing and the tree are then adjusted thereon and secured thereto by means of the terrets C, which pass through apertures in the said tree, housing, and burr-piece, and are screwed into the burrs or nuts $a$. The housing is further secured by screw-bolts D, which hold the loops E in position, and an aperture is formed in the center of the housing to receive the nut which holds the check-hook in position, thereby effectually preventing any lateral movement of the tree at that point, all as will clearly appear by reference to the drawings. As no other means are employed for securing the tree or the housing to the pad, the former can be removed at any time in a few moments, when it is requisite so to do, to facilitate any repairs which may be needed; or the said tree or housing, or both, may be removed from one pad and be adjusted upon another, and so be used interchangeably in connection with different pads, as will be readily seen and understood, thus making a very convenient, strong, and cheap tree-pad.

Having thus described my invention, what I claim, and wish to have secured by Letters Patent, is—

In a tree-pad, the combination of the pad carrying the nuts $a\ b$, secured to the inside of the leather burr-piece, the housing A, the tree B, having the flattened ends, and the terrets C, adapted to be secured together without any intervening jockey, as described, for the purpose set forth.

In testimony that I claim the foregoing I have hereunto set my hand this 22d day of September, 1882.

MELANCTHON E. ZELLER.

Witnesses:
 OLIVER DRAKE,
 CHARLES H. PELL.